J. A. RAMSEY.
MUD LUG FOR AUTOMOBILE WHEELS.
APPLICATION FILED DEC. 16, 1919.
1,357,300.
Patented Nov. 2, 1920.
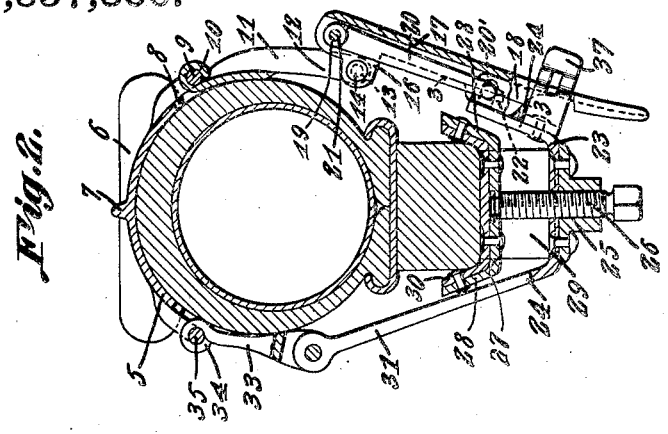
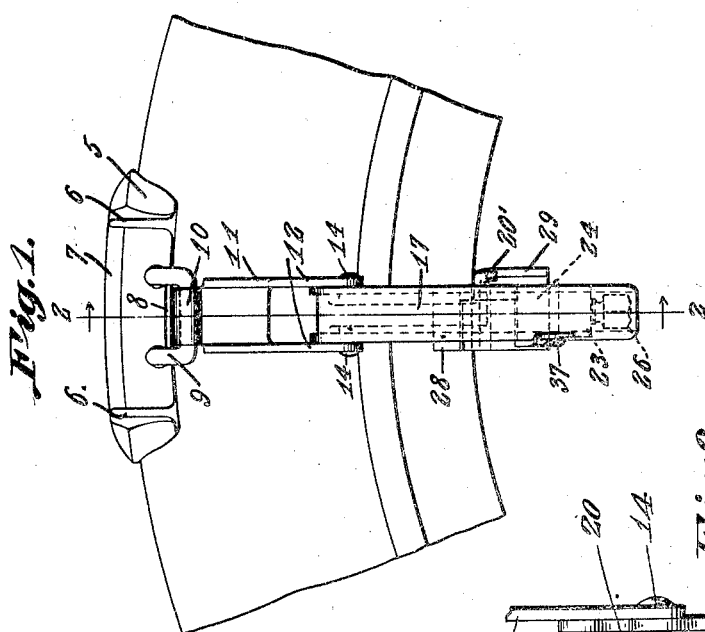
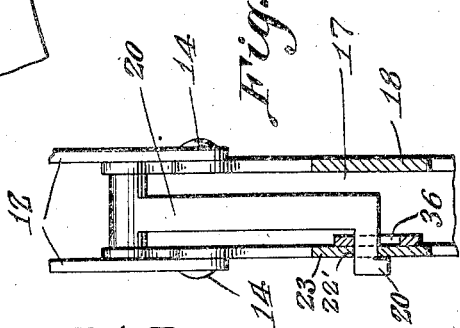
J. A. Ramsey, Inventor

UNITED STATES PATENT OFFICE.

JOSEPH A. RAMSEY, OF BEATRICE, NEBRASKA, ASSIGNOR OF ONE-HALF TO ROBERT L. STONE, OF BEATRICE, NEBRASKA.

MUD-LUG FOR AUTOMOBILE-WHEELS.

1,357,300. Specification of Letters Patent. Patented Nov. 2, 1920.

Application filed December 16, 1919. Serial No. 345,196.

*To all whom it may concern:*

Be it known that I, JOSEPH A. RAMSEY, a citizen of the United States, residing at Beatrice, in the county of Gage and State of Nebraska, have invented a new and useful Mud-Lug for Automobile-Wheels, of which the following is a specification.

This invention relates to new and useful improvements in anti-skid attachments for automobile tires and wheels, and it is the primary object of the invention to provide a device of this character which may be readily and easily applied to any wheel construction now in use.

A further object of the invention is to provide anti-skid devices including curved body portions adapted to encircle the tread of the tire associated therewith, together with means for locking the body portions to the wheels.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a fragmental view of a pneumatic tire showing the invention as applied thereto.

Fig. 2 illustrates a sectional view taken on line 2—2 of Fig. 1, and

Fig. 3 illustrates a sectional view taken on line 3—3 of Fig. 2.

Referring to the drawing in detail, the reference character 5 designates the body of the anti-skid device, and the same includes a curved inner portion, curved to conform to the tread of the usual automobile tire, the outer surface thereof being provided with the transversely extending ribs 6, which as shown, are preferably larger at the ends thereof, so that the same will present substantially wide shoulders for contact with the surface over which the wheel is operating, the transversely extending ribs being connected by the longitudinally extending ribs 7, which ribs prevent lateral movement of the wheel on which the same is supported, when lateral pressure is directed thereto.

Disposed adjacent one of the side edges of the body 5, is an opening 8, which opening provides the bar 9, for accommodating the eye 10 formed in the lower end of the connecting link 11, the other end of which is bifurcated as at 12, and apertured as at 13, to receive the pivot pin 14 passing through the apertures 13, and through suitable apertures formed in the ears 16, forming a part of the locking lever 17, the ears being disposed adjacent one end of the locking lever 17.

This locking lever 17 comprises a strip of material bent intermediate its width to provide opposed flanges 18, the flanges 18 being apertured adjacent the extreme inner end thereof as at 19, and embrace the lower end of the arm 20, the pin 21 being provided for pivotally connecting the locking lever 17 to the arm 20, so that movement of the locking lever 17 produces a relative movement of the arm 20, the upper end of which exends at right angles to the body portion thereof, to provide a pin 20′, the same being constructed to be positioned within the the opening 22, forming a part of the yoke 23, for connecting the yoke with one side of the body portion 5.

The yoke 23 comprises angularly extending arms 24 the arms extending at an angle to conform to the curvature of the inner edge of a felly, the same being provided with a central socket 25 which accommodates the threaded shank of the set screw 26, the lower end of which has connection with a movable clamping element 27, which also includes angularly disposed sections 28, and and an upwardly extending flange 29 engaging one of the side walls of the yoke 23 to prevent rotation of the clamping element 27, when the set screw 26 is being manipulated to force the clamping member 27 into engagement with the felly of a wheel, there being however, a strip of leather 30, riveted or otherwise secured to the inner surface of the clamping element to present a smooth surface for contact with the felly of the wheel to eliminate any possibility of the device marring or scratching the same.

An arm 31 is formed integral with the yoke 23, and one end thereof extends into close proximity with the opposite edge of the body 5, and has pivotal connection therewith, through the medium of the link 33, which has a section 34 pivotally embracing the pin 35 so that the arm 31 will be permitted to have a free pivotal movement with relation to the body 5 to facilitate the application of the device.

The locking lever 17, is provided with a notched portion 36, formed in one of the flanges 18, which notched portion embraces the pin 20' when the arm 20 is in its locked position, the lever 17 contacting with the spring clip 37 in its movement to its locked position, which spring clip 37 engages one of the flanges 18 for securing the same against displacement under ordinary conditions.

In the operation, anti-skid devices constructed in accordance with the present invention are disposed throughout the periphery of the tire to which the same are to be applied, the number of anti-skid devices employed, being determined by the conditions of the road over which the device is moving.

In the application of a device of this character, it is only necessary to remove the pin 20' from the opening 22, by moving the locking lever to a position out of contact with the arm 20, whereupon the yoke is positioned over the inner surfaces of the felly of the wheel, and the pin 20' is located in the opening 20. The lever is now moved into engagement with the arm 20, so that the device is locked to the wheel.

Having thus described the invention, what is claimed as new is:—

1. An anti-skid device for automobile tires including a body portion, a yoke having an opening formed therein, a connecting link having pivotal connection with the yoke, an arm having a pin formed on one arm thereof, said pin adapted to engage within the opening, a locking lever having pivotal connection with the link and arm for locking the arm to prevent displacement of the pin within the opening, and a clamping member operating in conjunction with the yoke.

2. In an anti-skid device for automobile tires, a body portion, pivoted link members connected to the body portion, an arm having connection with one of the link members, a yoke formed integral with the arm, said yoke having a threaded opening, a clamping member associated with the yoke, threaded means passing through the threaded opening of the yoke and having connection with the clamping member for moving the yoke and clamping member with relation to each other, and a locking lever having connection with the opposite link member and the yoke for securing the yoke and body portion together.

3. In an anti-skid device for automobile tires, a body portion, an arm having a yoke formed integral therewith, means for pivotally connecting the arm to the body portion, said yoke having a right angled keeper, a locking arm having a right angled end positioned in the opening, and a locking lever adapted to move downwardly and embrace the arm for securing the same in position.

4. In an anti-skid device for automobile tires, a body portion, an arm having a yoke formed integral therewith, means for pivotally connecting the yoke and the body portion, said yoke having a keeper, an arm having a right angled end adapted to be positioned in the keeper, means for pivotally connecting the arm and body portion, a locking lever eccentrically connected with said means, said locking lever having depending lateral flanges, one of said flanges having a cut out portion adapted to embrace the right angled end to secure the same against movement within the keeper, and a spring clip for securing the locking lever against movement.

In testimony that I claim the foregoing as my own, I have hereto affixed my signature in the presence of two witnesses.

JOSEPH A. RAMSEY.

Witnesses:
JOHN W. DELEHANT,
B. A. JOHANNES.